United States Patent [19]

Joe

[11] Patent Number: 5,321,556
[45] Date of Patent: Jun. 14, 1994

[54] VEHICLE SAFETY CONVEX REARVIEW MIRROR WITH DISTORTION OFFSET MEANS AND METHOD OF USING THE SAME

[76] Inventor: Tobby F. Joe, 2578 Daytona Ave., Hacienda Heights, Calif. 91745

[21] Appl. No.: 881,185
[22] Filed: May 11, 1992
[51] Int. Cl.$^5$ .............................................. G02B 5/08
[52] U.S. Cl. ........................ 359/863; 359/854; 359/864; 359/866; 359/868; 248/479; 248/483; 248/484
[58] Field of Search .............. 359/850, 854, 863, 864, 359/865, 866, 868; 248/479, 481, 483, 484

[56] References Cited

U.S. PATENT DOCUMENTS

| | | | |
|---|---|---|---|
| 2,857,810 | 7/1953 | Troendle | 359/868 |
| 3,003,396 | 10/1961 | Jenkins | 359/868 |
| 3,667,833 | 6/1972 | Baldwin, Sr. | 359/864 |
| 3,881,811 | 5/1975 | French | 359/864 |
| 4,264,144 | 4/1981 | McCord | 359/868 |
| 4,449,786 | 5/1984 | McCord | 359/868 |
| 4,575,202 | 3/1986 | McGuire | 359/866 |
| 4,674,849 | 6/1987 | Stewart | 359/850 |
| 4,824,231 | 4/1989 | Quintana | 359/864 |
| 4,936,533 | 6/1990 | Adams et al. | 248/483 |

FOREIGN PATENT DOCUMENTS

| | | | |
|---|---|---|---|
| 2054396 | 5/1972 | Fed. Rep. of Germany | 359/868 |
| 2629027 | 9/1989 | France | 359/864 |

*Primary Examiner*—Loha Ben
*Assistant Examiner*—Thomas Robbins
*Attorney, Agent, or Firm*—Thomas I. Rozsa; Tony D. Chen

[57] ABSTRACT

The present invention is a vehicle safety rearview mirror assembly with distortion offset element and method of using the same. The rearview mirror assembly comprises an elongated convex mirror. The convex mirror is independently supported by a double-ball-joint shank and a mounting base affixed on the windshield of the vehicle. The present invention also provides a method to offset the distortion created by the convex mirror. The method combines a safety reference and a safety locker to tell the driver whether and when it is safe to change lanes or make turns. The safety reference includes two opposite end portions of the rearward visual field respectively prescribed by the side windows of the vehicle, and the safety locker includes the central portion of the extended rearward visual field respectively prescribed by the rear window of the vehicle. When another vehicle appears in the safety reference, it is not safe to change lanes or make turns; when the other vehicle appears in the safety locker, it is safe to change lanes or make turns if the front end of other vehicle is entirely visible in the safety locker because by then the distance between the driver's vehicle and the other vehicle is farther than the nearest safety distance.

55 Claims, 3 Drawing Sheets

VEHICLE SAFETY CONVEX REARVIEW MIRROR WITH DISTORTION OFFSET MEANS AND METHOD OF USING THE SAME

BACKGROUND OF THE INVENTION

1. Field of the Invention

The present invention relates to the field of vehicle mirror systems which offset the visual distortion created by a convex rearview mirror to the drivers of vehicles. More particularly, the present invention relates to the field of vehicle rearview mirror systems which create a combination of features in order to offset the visual distortion created by a convex rearview mirror and satisfies the federal safety standards, such features including a full-view rearward visual field containing no blind spots for revealing all lanes of uninterrupted roadway traffic, a clarity of image for helping drivers distinguish between one lane and another with vehicles traveling in them, a safety reference to help drivers judge when it is not safe to make a lane change or a turn, a safety locker to help drivers judge when it is safe to make a lane change or a turn, and a nearest distance to prove why it is safe for drivers to change lanes or make turns.

2. Description of the Prior Art

A rearview mirror system is a necessary safety equipment installed on a vehicle. A quick glance in the rearview mirror while operating a vehicle is something most of the drivers do more than once every minute. This probably makes the rearview mirror system one of the most important safety elements of a vehicle.

An increase in motor vehicle operators brings an unfortunate by-product-increased accidents, and even more near-accidents, that are brought about by increasing vehicle population. The Department of Motor Vehicles figures shows the number of registered vehicles exceeds 194.5 million, and the number of licensed drivers exceeds 170 million. According to the statistics of death, injury and collision loss experience resulted from vehicular accidents composed by the National Highway Traffic Safety Administration (NHTSA), the collision rate exceeds once in every second, the injury rate exceeds three people in every minute, and the death rate is approximately one person in every 11 minutes. Current cars are coming up with more safety developments, which may have better injury experience that corresponding earlier models. However, collision experience can be expected to remain on the rise without solving the drivers' visual problems. If all blind spots surrounding the vehicle can be completely eliminated, the collision fate will be reduced substantially. Unfortunately, the conventional vehicle rearview mirror system continues to have blind spots which leads to vehicular accidents.

Unless one piece of mirror plate which can provide a full-view rearward visual field all in just one picture, revealing all lanes of uninterrupted roadway traffic, it cannot wholly eliminate the blind spots surrounding the vehicle. However, mere one piece of flat mirror plate cannot provide a full view rearward visual field to the driver, and a multiple mirror plates system cannot provide a full-view rearward visual field all in just one picture either. It is an underlying principle that a convex rearview mirror can provide a full-view rearward visual field all in just one picture, but it also creates a highly visual distortion which can cause visual misjudgments to lead to vehicular accidents. However, if the visual distortion created by the convex rearview mirror can be offset, then all blind spots surrounding the vehicle can be completely eliminated, so that the vehicular accidents will be substantially reduced.

Mirrors with curved surfaces were introduced as early as the 13th century, since the wider viewing angle feature created by convex mirror has been common. The convex rearview mirrors were applied to automobiles in many decades ago, since the visual distortion feature created by the convex rearview mirror has been common. Thousands of motorists by convex rearview mirrors that are supposed to assist in eliminating the blind spots because the wider viewing angle feature created by convex mirror. The NHTSA has strict rules that forbid manufacturers or service garages from installing such convex rearview mirrors because the visual distortion also created by convex mirror. On the one hand, the conventional vehicle rearview mirror system continues the have blind spots, which can lead to vehicular accidents. On the other hand, the wider viewing angle convex rearview mirrors continue to have visual distortion, which can also lead to vehicular accidents.

In attempt to improve upon the conventional vehicle rearview mirror system it has been suggested to use a convex mirror. For example, U.S. Pat. No. 4,895,435 issued to Shomper discloses a convex vehicle rearview mirror. The convex mirror is attached to the interior sun visor of the vehicle, in front of the driver's seat. Since the convex mirror creates a wider view angle, the driver is able to see a wider rear view. However, this prior use of an interior convex rearview mirror has some problems. First, the sun visor in front of the driver's seat has been specially designed toward the driver's eye level for blocking off the sun light. Therefore any mirror attached to it would be positioned too low and could cause the blockage of the driver's rear view, because the mirror will reflect all the objects which exist in front of it within its viewing coverage including the driver's and even the passenger's heads, which become new blind spots to the driver. Besides, the sun visor can even block the driver's visual sight from seeing the signals while approaching to intersections. In addition, when a mirror has a convex shape, the reflected objects look farther away than they really are, creating a visual distortion which causes visual misjudgments and leads to vehicular accidents. Drivers cannot use such a convex rearview mirror effectively and safely without knowing how to offset that visual distortion created by the convex rearview mirror.

It would be illegal for a manufacturer or service garage to use any devices "which render inoperative the effectiveness" of a federal standard except the convex rearview mirror on the right side of most vehicles, bear a warning about the visual distortion created by convex mirror. However, without knowing how to offset that visual distortion created by convex mirrors, even bearing the warning about the visual distortion under the federal law, a mere full-view convex rearview mirror alone cannot help drivers judge the closing speed, positions and distances of other vehicles. Therefore, a mere full-view convex rearview mirror alone cannot actually help the drivers operate the convex rearview mirrors safely and effectively.

When a mirror has a convex shape, the smaller the radius of curvature, the wider the viewing angle it creates. However, the convex mirror with smaller radius of curvature also creates higher visual distortion. In addition, it reduces the clarity of the image. This is highly undesirable for vehicle drivers, especially to the senior drivers who physically are not active and have customary visual problems caused by aging. According to the statistics from the NHTSA, the total number of licensed drivers exceeds 170 million, wherein 35 million of them are over the age of 65. This portion of older drivers is on the rise because people are living longer. Therefore, to the vehicle driver, a clarity of image becomes one of the major factors of a full-view rearview mirror.

The greater the radius of curvature, the clearer the image that can be produced by the convex mirror. Therefore, a wider viewing angle and a clearer image can be created by elongating the length of a convex mirror to allow a greater radius of curvature. However, the interior dimensions of a vehicle place a limit on the length of such elongated convex rearview mirrors. For example, the driver's seat is located at one side rather than at the center of a vehicle, but the rearview mirror is mounted at the center of the front windshield facing to the rear of the vehicle. Therefore, the driver may see only partial rear viewing coverage of the mirror (less than about 15 degrees) on the driver's side of the vehicle, which leaves blind spots on the left side of the vehicle. Therefore it is often necessary to swing the rearview mirror to adjust its angle, so the driver can obtain an appropriate rearward visual field. However, the close distance between an elongated convex rearview mirror and the front windshield of the vehicle will limit the amount of swinging angle on the elongated convex rearview mirror.

In addition, the prior use of a convex rearview mirror by stick-on, clip-on or attached to the existing devices of a vehicle has some other problems. The existing devices of the vehicle, such as sun visors, have been specially designed for their special functions and installed in special locations. The convex rearview mirror attached to such existing devices may not perform properly. It is preferable to mount the rearview mirror to the front windshield of the vehicle with an independent mirror support means. However, on the one hand a shorter mirror support means is needed to offset the mirror vibration to ensure the safety of the front windshield and stability of the image because the weight of the elongated rearview mirror is substantially increased; on the other hand, an elongated support means is also needed to provide maximum flexibility for adjusting the angle of the rearview mirror.

Moreover, a mere full-view convex rearview mirror alone cannot be safely and effectively used unless an effective method is provided for the drivers to offset the visual distortion created by the convex rearview mirror. Without such a method, the prior art convex rearview mirrors cannot solve the driver's visual misjudgment problems, nor can the federal safety standard be satisfied. Until now, no such safety method is known which can let the drivers know how to offset the visual distortion created by the convex rearview mirror.

Accordingly, there remains a need for a new type of convex rearview mirror for vehicles, which has an elongated length with a long radius of curvature to improve the clarity of the convex rearview mirror. There further remains a need for an independent mirror support device which is specially designed to allow greater adjustability of the elongated convex rearview mirror, both in its height and in its angle, yet provides a vibration-free attachment. There also remains a need for a method which can actually help the drivers to judge whether and when it is safe to make a lane change or a turn. There remains an additional need for a formula to prove why the method is a safe method for drivers to use to offset the visual distortion created by the convex rearview mirror, to satisfy the federal safety standard.

SUMMARY OF THE INVENTION

The present invention is a vehicle safety convex rearview mirror with distortion offset means and method of using the same.

It is known that a convex rearview mirror with a small radius of curvature will cause great distortion of the image. An elongated convex rearview mirror with a large radius of curvature produces less distortion and clearer image. However, an elongated convex rearview mirror still creates distortion and increases the difficulty for attachment to the interior of a vehicle. It requires an independent vibration-free supporting device, so that when the elongated convex mirror is mounted inside the vehicle, it is located in a spaced apart relationship from the front windshield of the vehicle, so that it can be swung and adjusted to different angles according to the individual driver's preference, and it is located at a height where the driver's head or the passengers' heads will not block the driver's rear view through the convex rearview mirror.

The present invention satisfies these requirements. The present invention is a vehicle safety convex rearview mirror with distortion offset means and method using the same. It is a combination of an elongated convex rearview mirror for providing a full rearward vision to a driver of a vehicle and a safety method for allowing the driver to offset the distortion created by the convex rearview mirror. By using the present invention distortion offset method in conjunction with the present invention elongated convex rearview mirror, a vehicle driver can have a full-view rearward vision with a clarity of image and without blind spots. The driver can see all lanes of traffic at a glance and distinguish between one lane and another with vehicles traveling in them. The driver is able to judge the closing speeds, positions and distances of other vehicles for the driver to safely change lanes or make turns. The driver is also able to operate the convex rearview mirror effectively and safely.

The present invention has many unique features. One of the unique features of the present invention is that its convex rearview mirror has a substantially elongated length (as compared to conventional rearview mirrors) and a substantially large radius of curvature (as compared to conventional convex mirrors used in vehicles). Therefore, the convex rearview mirror of the present invention has a substantially small curvature but still enables a driver to have a full rearward vision.

Another unique feature of the present invention is that its elongated convex rearview mirror includes an independent mirror support which can be mounted directly to the interior surface of the front windshield of the vehicle. The independent mirror support has two ball-joints with offset U-shaped notches which maximizes the adjustability of the elongated convex mirror.

A further unique feature of the present invention is that it provides a reliable and practical method to effectively offset the distortion created by the convex mirror. The present invention method establishes a "safety reference" for a driver to judge when it is not safe to make a lane change or a turn. The present invention method also establishes a "safety locker" for the driver to judge when it is safe to make a lane change or a turn. The present invention method further establishes a "nearest safety distance" to prove that the visual distortion of the convex mirror is indeed offset and the federal safety laws and regulations are satisfied.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a vehicle safety rearview convex mirror apparatus with distortion offset means and method of using the same. The present invention vehicle safety rearview convex mirror apparatus will be described first. The present invention rearview distortion offset method will then be introduced. Finally, it will be proved that the present invention vehicle safety method as used in conjunction with the present invention rearview mirror apparatus is safe and satisfies the federal safety standards.

Figures 1, 2, 3, 4:
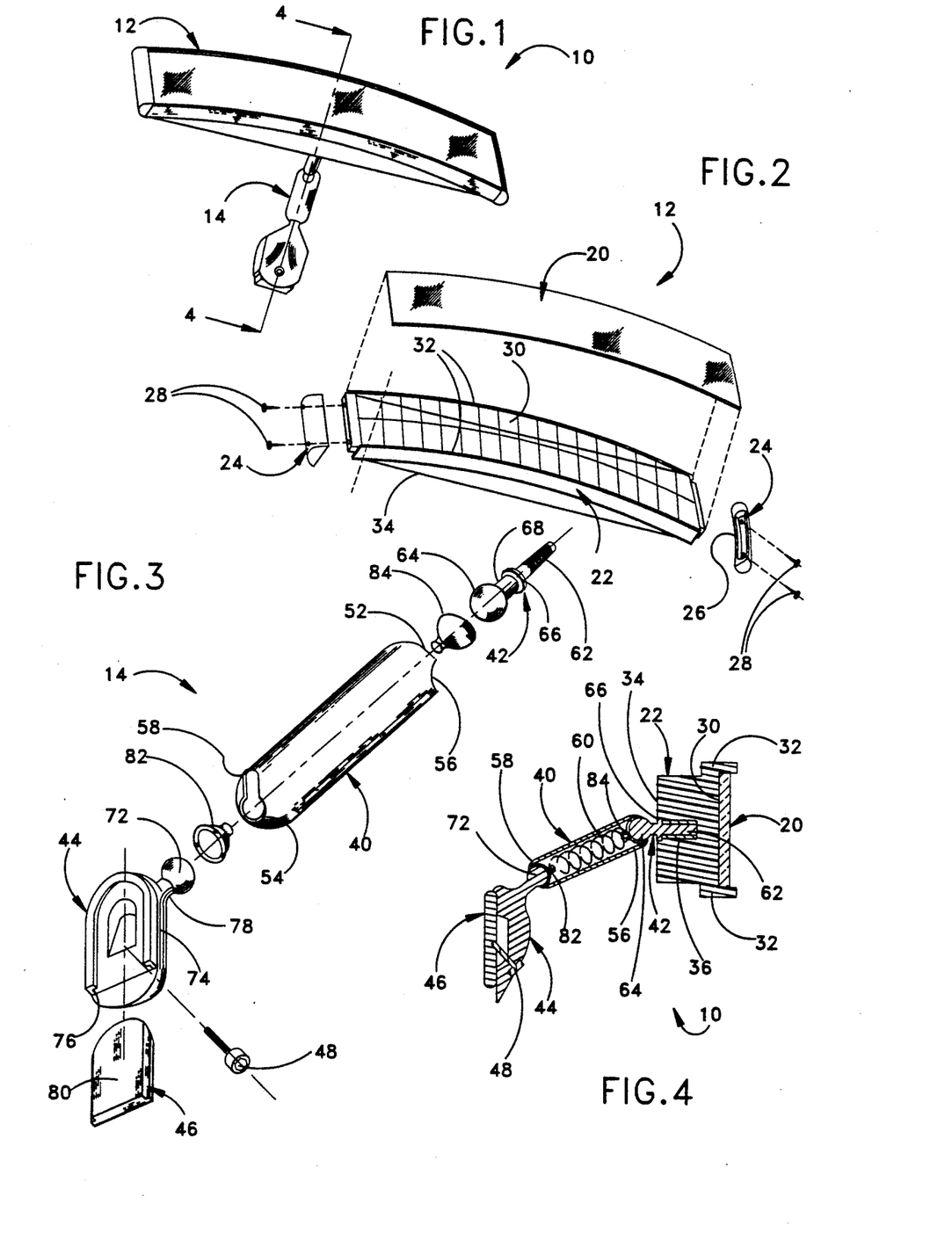
FIG. 1 is a perspective view of the present invention vehicle safety rearview mirror assembly with distortion offset means, including an elongated convex mirror and an extended swivel support.
FIG. 2 is an exploded view of the elongated convex mirror of the present invention vehicle safety rearview mirror assembly with distortion offset means.
FIG. 3 is an exploded view of the extended swivel support of the present invention vehicle safety rearview mirror assembly with distortion offset means.
FIG. 4 is a cross-sectional view taken along line 4—4 of FIG. 1, showing the releasible attachment of the present invention vehicle safety rearview mirror assembly with distortion offset means.

Referring to FIG. 1, there is shown at 10 the present invention full-view vehicle safety rearview mirror assembly. The present invention rearview mirror assembly 10 includes two essential components: an elongated convex mirror 12 and an extended swivel support 14. The elongated convex mirror 12 and the extended swivel support 14 can be detachably attached together and mounted onto the interior surface of the front windshield of a vehicle, at a top central position of the windshield.

Referring to FIG. 2, the elongated convex rearview mirror 12 of the present invention mirror assembly 10 includes a mirror plate 20, a mirror housing 22 and two end-covers 24. The mirror plate 20 is an elongated rectangular shaped convex mirror having a small curvature or a long radius of curvature. The specific dimensions will be discussed in detail later. The mirror housing 22 has a arcuate configuration. The front side of the mirror housing 22 is an elongated convex backing 30 which has two parallel guards 32. The curvature of the convex backing 30 is the same as that of the mirror plate 20. The back side 34 of the mirror housing is generally flat and has a built-in screw nut 36 (not shown in FIG. 1 but shown in FIG. 4). The two end-covers 24 each have an inner recess 26.

The two parallel guards 32 are both a little bit shorter than the convex backing at their opposite ends. However, the mirror plate 20 has exactly the same length as the convex backing 30. Therefore, once the mirror plate 20 is placed on the convex backing 30 between the two parallel guards 32, the opposite ends of the mirror plate 20 and the convex backing 30 are respectively aligned and extended beyond the opposite ends of the two parallel guards 32, allowing the end-covers 24 to be snugly attached. The aligned and extended opposite ends of the mirror plate 20 and the convex backing 30 are respectively fitted within the recesses 26 of the end-covers 24. The end-covers 24 are further secured to the opposite ends of the convex backing 30 by small screws 28.

This special assembly of the elongated convex rearview mirror 12 ensures that the mirror plate 20 is securely framed. The mirror plate 20 is fully supported by the convex backing 30 which can reduce possible harm from flying glass in case of an accident. The two parallel guards 32 prevent the mirror plate 20 from sliding up and down, and the end-covers 24 prevent the mirror plate 20 from sliding back and forth. In addition, since the opposite ends of the mirror plate 20 are snugly fitted within the recesses 26 of the end-covers 24 respectively, the mirror plate 20 is prevented from falling off. Furthermore, this releasible assembly makes it easier to replace the mirror plate 20, should it become damaged.

Referring to FIG. 3, the extended swivel support 14 of the present invention mirror assembly 10 includes a double-ball-joint shank 40, a hub 42, a mounting base 44 and a mounting plate 46 which can be fastened to the mounting base 44 by a screw 48. The double-ball-joint shank 40 is a hollow tubular piece having a spherical socket 52 at its proximal end and another spherical socket 54 at its opposite distal end. The spherical socket 52 at the proximal end of the shank 40 has a U-shaped notch 56, the spherical socket 54 at the distal end of the shank 40 also has a U-shaped notch 58. However, the two U-shaped notches 56 and 58 are offset relative to each other to allow the maximum adjustability of the location and the orientation of the elongated convex rearview mirror 12. A coil spring 60 is further provided inside the tubular shank 40 for biasing the ball-joints.

The hub 42 has screw threads 62 at its proximal end for engagement with the built-in screw nut 36 (shown in FIG. 4) at the back side 34 of the mirror housing 22. The hub 42 further has a pivot ball 64 at its distal end for engagement with the spherical socket 52 at the proximal end of the shank 40. A circular flange 66 is also provided on the hub 42 for engagement with the back side 34 of the mirror housing 22. The distal portion 68 of the hub 42, between the pivot ball 64 and the circular flange 66, is configured as a short stem and has a thickness which is matching with the U-shaped notch 56 at the proximal end of the shank 40.

The mounting base 44 also has a pivot ball 72 at its proximal end for engagement with the spherical socket 54 at the distal end of the shank 40. The mounting base is further configured with a thickened distal portion 74 which has a guided slot 76 for adapting the mounting plate 46. The proximal portion 78 of the hub mounting base 44, between the pivot ball 72 and the thickened distal portion 74, is also configured as a short stem and has a thickness which is matching with the U-shaped notch 58 at the distal end of the shank 40. The mounting plate 46 can be slid into the guided slot 76 of the mounting base 44 and fastened therein by the screw 48. The mounting plate 46 has a flat surface 80 which is exposed when the mounting plate 46 is slid into the guided slot 76. The flat surface 80 of the mounting plate 46 can be adhered to the interior surface of a vehicle windshield by appropriate adhesive materials.

Two semi-spherical cups 82 and 84 are also provided inside the tubular shank 40 for engaging with the pivot ball 64 of the hub 42 and the pivot ball 72 of the mounting base 44 respectively. The semi-spherical cups 82 and 84 are frictionally engaged with the pivot balls 64 and 72 and biased by the internal coil spring 60. They protect the pivot balls 64 and 72 from rotating damages and reducing the vibration of the mirror housing 22.

Referring to FIG. 4, there are shown many special features of the attachment of the various parts of the present invention convex rearview mirror assembly 10. It is shown that the mirror plate 20 is supported by the convex backing 30 between the two opposite guard 32. The convex backing 30 and the two opposite guards 32 in fact form an elongated channel for the placement of the mirror plate. It is also shown that the proximal end of the hub 42 is threaded into the built-in screw nut 36 until the flange 66 of the hub 42 rests on the back side 34 of the mirror housing 22. It is further shown that the two ball joints of the tubular shank 40 are frictionally engaged and biased by coil spring 60, so that they can stay put at any orientation. In addition, it is shown that the mounting plate 46 is secured to the mounting base 44 by the screw 48.

It is specially designed to offset the two U-shaped notches 56 and 58 on the double-ball-joint tubular shank 40 for engagement with the distal stem 68 of the hub 42 and the proximal stem 78 of the mounting base 44 respectively, to shorten the necessary length of the shank 40 so that the weight and vibration of the mirror 12 can be substantially reduced. After the mounting base 44 is mounted on the interior surface of the vehicle windshield, the driver can twist the shank 40 so that the proximal U-shaped notch 56 is adjusted facing downwardly, which makes the distal U-shaped notch 58 facing upwardly. The height of the elongated convex rearview mirror 12 can be raised by rotating the shank 40 along the counter-clockwise direction until the mirror housing 22 snugly contacts the roof of the vehicle to reduce its vibration, which is desirable because the driver's rear view is not blocked by the driver's head or other passengers' heads. The U-shaped notch 58 at the distal end of the tubular shank 40 allows the shank 40 to be rotated additional degrees along the counter-clockwise direction, until the proximal stem 78 of the mounting base 44 is fully engaged within the distal U-shaped notch 58 of the shank 40.

Once the elongated convex rearview mirror 12 is raised to the higher position, its orientation can be adjusted by rotating the mirror housing 22 along the clockwise direction until the mirror plate 20 is generally facing the driver, which is desirable because it is adjustable as to the height of the individual driver. The U-shaped notch 56 at the proximal end of the tubular shank 40 allows the mirror housing 22 to be rotated additional degrees along the clockwise direction, until the distal stem 68 of the hub 42 is fully engaged within the proximal U-shaped notch 56 of the shank 40.

The unique feature of the two offset U-shaped notches 56 and 58 makes it possible to substantially shorten the length of the shank 40 without sacrificing the flexibility of adjusting the location and orientation of the mirror housing 22. This unique feature substantially reduces the weight and vibration of the rearview mirror assembly 10, further ensures the safety of the front windshield of the vehicle, and completely eliminates the blind spots created by the driver's head and the passengers' heads. Moreover, this unique feature further extends the visual field of the driver in the downward directions of the rear end of the vehicle.

In a preferred embodiment of the present invention, the radius of curvature of the elongated convex mirror plate 20 is approximately 78 inches, the length of the elongated convex mirror plate 20 is approximately 18 inches, and the width of the elongated convex mirror plate 20 is approximately 2 inches. The radius of curvature and the length are two important parameters of the present invention convex mirror plate 20, because they together define the coverage of the rearward vision of the convex mirror. In addition, the length of the double-ball-joint shank 40 is approximately $2\frac{3}{4}$ inches, which is adequate for allowing maximum flexibility to adjust the position of the elongated convex rearview mirror 12.

Figure 5:
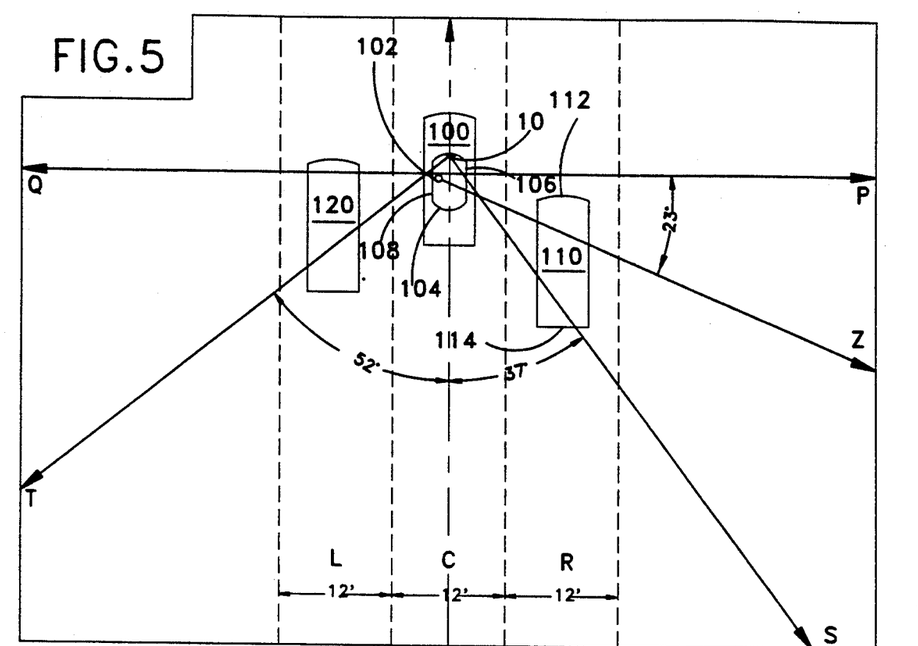
FIG. 5 is an illustrative diagram showing the relative positions of vehicles traveling along a roadway and the rearview coverage provided by the present invention vehicle safety rearview mirror assembly with distortion offset means.

Referring to FIG. 5, there is shown the full-view coverage of rearward vision of the present invention elongated convex rearview mirror 10 as it is installed in a vehicle 100 and adjusted to face a driver 102. When the driver 102 drives the vehicle 100 on the roadway, the driver's forward visual field is 180 degrees between the two lateral lines P and Q. Now, if the elongated convex rearview mirror 10 is 18 inches long and has a 78 inches radius of curvature, then it can provide the driver 102 a total of approximately 89 degrees of rearward visual field between lines S and T, which includes an approximately 37 degree rearward visual field on the right side of the vehicle 100, and an approximately 52 degree rearward visual field on the left side of the vehicle 100. These two rearward visual field are not equal because the elongated convex rearview mirror 10 is tilted towards the driver 102. In addition, since the driver's head turns towards the right when the driver 102 directly looks at the elongated convex rearview mirror 10, the driver 102 has an additional approximately 23 degrees of right side visual field, between lines P and Z. Therefore, theoretically the only "blind spots" left after the present invention elongated convex rearview mirror 10 is being used, are the right side area between lines Z and S, and the left side area between lines Q and T.

However, in a practical sense these "blind spots" are not really "blind" to the driver 102. This is because the width of each driving lane of the roadway is relatively fixed and all vehicles travelling on the roadway have certain dimensions. For example, the width of each driving lane of average roadways is approximately 12 feet, a passenger car has an average length of approximately 15 feet and an average width of approximately 5.5 feet. When such a vehicle 110 is travelling on the next right lane R in the proximity of the right "blind spot" area between lines Z and S, either the front end 112 of the vehicle 110 would be seen directly by the driver's additional right side vision, or the rear end 114 of the vehicle 110 would be seen by the driver through the elongated convex rearview mirror 10. Moreover, even the smallest vehicle travelling on the roadway, such as a motorcycle 120, has an average length of 10 feet and an average width of 3 feet. This make it visible even when it is travelling on the next left lane L and located in the proximity of the left side "blind spot" area between lines Q and T.

Therefore, the present invention elongated convex rearview mirror 10 can indeed provide a full-angle rearward view to the traffic condition on the roadway. However, as introduced earlier, any convex mirror will create certain visual distortion. Particularly, the vehicles observed through a convex rearview mirror will seem to be further than they actually are. In other words, the real distance between the driver's vehicle and a vehicle behind would be closer than it appears in the mirror. That is why using a convex mirror without an effective way to offset distortion is dangerous.

The present invention rearview mirror 10 is also a convex mirror which creates certain distortion. However, the present invention rearview mirror 10 has a substantially large radius of curvature, which minimizes the distortion. More importantly, the present invention further comprises a method for offsetting the distortion which can actually help the driver safely to change lanes or make turns. The present invention method establishes three important features, a "safety reference", a "safety locker", and a "nearest safety distance". The first two features enable the driver to judge correctly whether and when it is safe to make a lane-change or a turn. The third feature is utilized in proving why using the safety locker feature really makes it safe to change lanes or make a turn.

Figure 6:
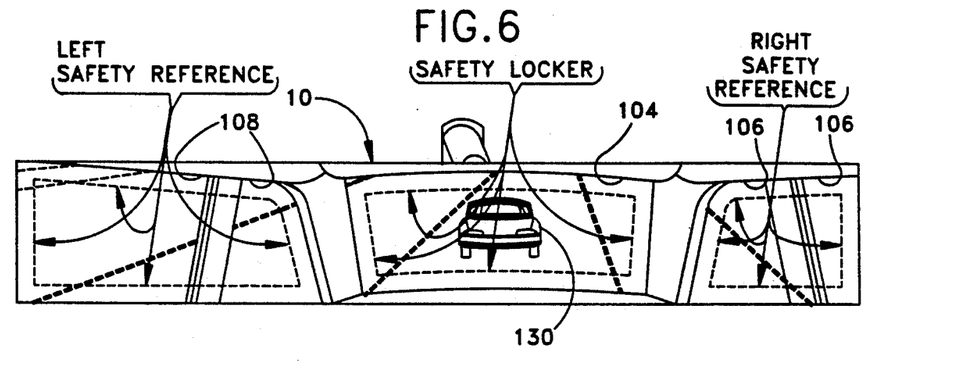
FIG. 6 is an illustrative diagram showing the actual rearward vision in the present invention elongated convex mirror as it is installed in a vehicle and the vehicle is traveling on a multi-lane roadway, where the interior of the vehicle including the rear and side windows and the multiple lanes of the roadway are shown in the mirror.

Referring to FIG. 6, there is shown an illustrative diagram, showing the actual rearward vision in the present invention elongated convex rearview mirror 10 as it is installed in a vehicle and the vehicle is traveling on a multi-lane roadway. The interior of the vehicle including the rear window 104, right side windows 106 and left side windows 108, as well as the multiple lanes of the roadway and the following vehicles, such as vehicle 130, are shown in the mirror. Unlike a traditional flat rearview mirror, the present invention elongated convex rearview mirror 10 provides a full-view rearward visual field. The rearward visual field includes the center lane C, the next right adjacent lane R, and the next left adjacent lane L. The rearward visual field can be viewed through the rear window 104, the right side windows 106 and the left side windows 108 of the vehicle. The central portion (surrounded by dotted lines) of the present invention rearview mirror 10 which reflects the rear window frame of the vehicle is defined as the "safety locker" of the rearward visual field. The end portions (also surrounded by dotted lines) of the present invention rearview mirror 10 which reflects the side window frames of the vehicle is defined as the "safety reference" of the rearward visual field. The safety reference, of course, includes two portions: a right safety reference at the right end portion of the rearview mirror 10 which reflects the right side window 106 of the vehicle, and a left safety reference at the left end portion of the rearview mirror 10 which reflects the left side window 108 of the vehicle.

Figure 7:
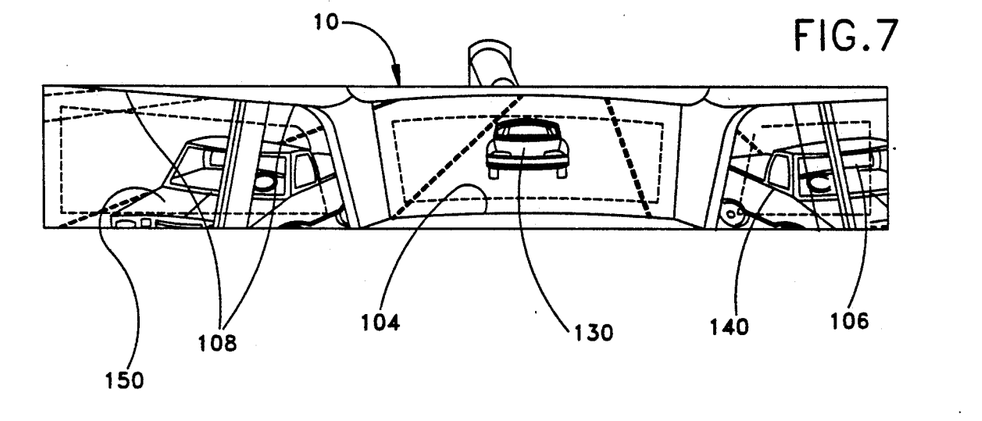
FIG. 7 is an illustrative diagram showing the actual rearward vision in the present invention elongated convex mirror as it is installed in a vehicle and the vehicle is traveling on a multi-lane roadway, where the interior of the vehicle including the rear and side window and vehicles traveling on the multiple lanes of the roadway are shown in the mirror, suggesting to the driver that it is not safe to make a lane change or a turn, based on the present invention feature of "safety reference".

Referring to FIG. 7, there is shown an illustrative diagram, showing how the driver can use the "safety reference" to judge when it is not safe to make lane changes or turns. For example, if a vehicle 140 on the right lane R can been seen within the right end portion of the rearview mirror 10, which reflects the rear-right visual field through the right side window 106 of the vehicle, then the vehicle 140 is said to be within the right safety reference of the rearward visual field. When the vehicle 140 is seen in the right safety reference, it is not safe to change to the right lane R, or make a right turn. Similarly, if a vehicle 150 on the left lane L can be seen within the left end portion of the rearview mirror 10, which reflects the rear-left visual field through the left side window 108 of the vehicle, then the vehicle 150 is said to be within the left safety reference of the rearward visual field. When the vehicle 150 can be seen in the left safety reference, it is not safe to change to the left lane L, or make a left turn.

Therefore, with the safety reference, the driver can easily tell from a quick glance at the rearview mirror 10 when it is not safe to make a lane change or a turn. The safety rule of the present invention rearview mirror 10 with regards to the safety reference is: whenever a vehicle appears within the safety reference of the rearward visual field of the rearview mirror 10, either on the right adjacent lane R or on the left adjacent lane L, it will not be safe to change lanes or make turns.

Figure 8:
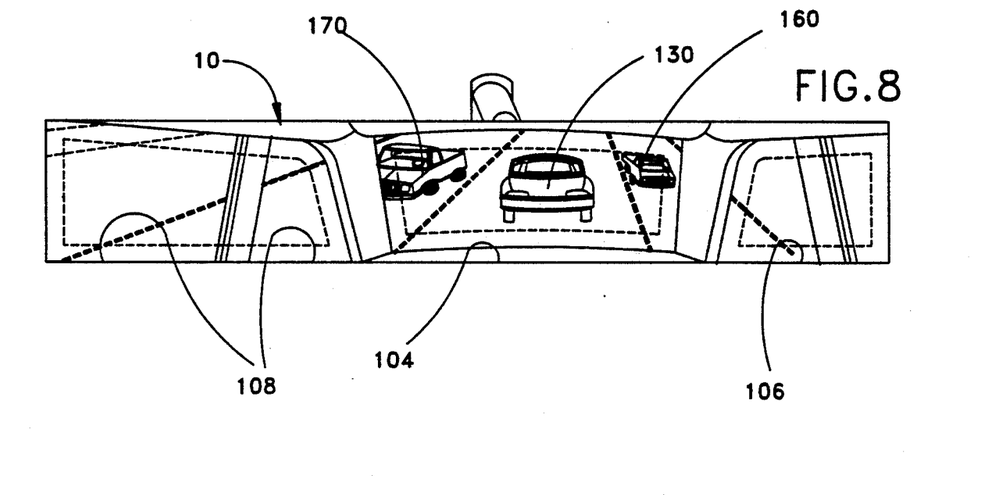
FIG. 8 is also an illustrative diagram showing the actual rearward vision in the present invention elongated convex mirror as it is installed in a vehicle and the vehicle is traveling on a multi-lane roadway, where the interior of the vehicle including the rear window frame and vehicles traveling on the multiple lanes of the roadway are shown in the mirror, suggesting to the driver that whether and when it is safe to make a lane change or a turn, based on the present invention feature of "safety locker".
Figure 9:
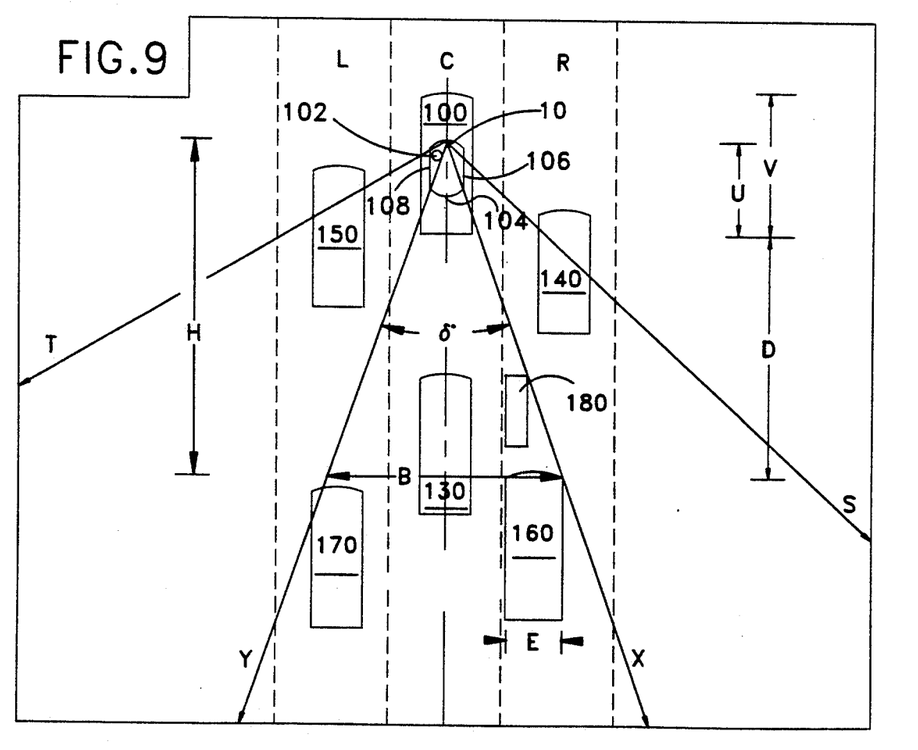
FIG. 9 is an illustrative diagram showing the relative positions of the vehicles travelling along a roadway and why the present invention distortion offset method is safe to use, based on the present invention feature of "nearest safety distance".

Referring to FIGS. 8 and 9, there is shown an illustrative diagram, showing how the driver can use the "safety locker" to judge when it is safe to make lane changes or turns. For example, if the entire front end or hood of a vehicle 160 on the right lane R can be seen within the central portion of the rearview mirror 10, which reflects the rearward visual field through the rear window 104 of the vehicle, then the vehicle 160 is said to be within the safety locker of the rearward visual field. When the vehicle 160 is seen in the safety locker, it is safe to change to the right lane R, or make a right turn. However, if only the main portion of a vehicle 170 on the left lane L can be seen in the safety locker, but its front end or hood is not entirely visible, it is not safe to change to the left lane L, or make a left turn.

Therefore, with the safety locker, the driver can again easily tell from a quick glance at the rearview mirror 10 when it is safe to make a lane change or a turn. The safety rule of the present invention rearview mirror 10 with regards to the safety locker is: when the entire front hood of the nearest vehicle in either adjacent lanes is completely visible within the safety locker of rearward visual field of the rearview mirror 10, it is safe to change to that adjacent lane or make a turn to that side; when the front hood of this nearest vehicle is only partially visible within the safety locker, it is not safe to change that adjacent lane or make a turn to that side. The key point is to see the "entire hood" of this nearest vehicle within the safety locker. If only a partial hood of this nearest vehicle can be seen within the safety locker, it is not safe to change to that adjacent lane or make a turn to that side. In addition, during night driving, "both headlights" can serve as a substitute for the entire hood of this nearest vehicle within the safety locker.

The above discussion is further illustrated in FIG. 9. Referring to FIG. 9, there is shown the relative positions of the vehicles described above as they travel on the multi-lane roadway. The vehicle 100 is in the center lane C. The entire rearward visual field of the driver 102, which is provided by the present invention elongated convex rearview mirror 10, is the area between lines S and T. The safety locker covers the area between lines X and Y, the right safety reference area covers the area between lines S and X, and the left safety reference covers the area between lines T and Y. Lines X and Y are drawn from the rearview mirror 10 and respectively intersect the opposite points of the adjacent lanes R and L through the opposite ends of the rear window 108 of the vehicle 100.

It can be seen that, for example, when vehicle 140 on the right lane R is visible in the right safety reference of the rearward visual field of the present invention mirror 10, it is too close to the vehicle 100 on the center lane C such that the vehicle 100 cannot safely change to right lane R or make a right turn. Similarly, when vehicle 150 on the left lane L is visible in the left safety reference of the rearward visual field of the present invention mirror 10, it is again too close to the vehicle 100 such that the vehicle 100 cannot safely change to left lane L or make a left turn. Therefore the safety reference is indeed a reliable safeguard for providing warnings to the driver 102.

It also can be seen that, for example, when the vehicle 160 on the right lane R is entirely visible in the safety locker of the rearward visual field of the present invention mirror 10, it is far enough behind the vehicle 100 on the center lane C such that the vehicle 100 can safely change to right lane R or make a right turn. In contrast, for example, when the vehicle 170 on the left lane L is not entirely visible in the safety locker of the rearward visual field of the present invention mirror 10 (rather, its hood is only partially visible in the safety locker), it is too close to the vehicle 100 such that the vehicle 100 cannot safely change to left lane L or make a left turn.

The safeness of changing lanes or making turns when the entire front hood of a nearest vehicle travelling in either adjacent lanes is completely visible in the safety locker can be proved based on the concept of "nearest safety distance". The nearest safety distance is the minimum constant distance between the rear bumper of the driver's vehicle in the front and the front bumper of the nearest vehicle in the back, which can be expressed by the vehicle length V. When the driver's vehicle and the following vehicle maintain a nearest safety distance, the travelling speed of the following vehicle must be the same or slower than that of the driver's vehicle, which probably makes it safe for the driver's vehicle in the front to make a lane change. Therefore the nearest safety distance can ensure the safety of changing lanes or making turns.

It can be proved that when the entire front end or hood of a vehicle is visible in the safety locker, then the vehicle is farther away than the nearest safety distance. Take vehicle 160, which is entirely visible in the safety locker, as an example. The distance D between vehicle 100 and vehicle 160 is $$D = H - U$$

where H is the altitude of the isosceles triangle formed by lines X, Y and base line B (lines X and Y are the margins of viewing angle of convex rearview mirror 10 through the rear window 104 of the vehicle 100):

$$H = (B/2) \cdot c \tan(\delta/2)$$

and U is the length of the V of the vehicle 100 less the front hood portion, which in most passenger cars is approximately $$U = (3/5) \cdot V$$

because in typical passenger cars, the ratio of U to V is approximately 3 to 5. For example, for large passenger cars U is approximately 9.5 feet and V is approximately 16 feet, for mid-size passenger cars U is approximately 9 feet and V is approximately 15 feet, and for small passenger cars U is approximately 8.5 feet and V is approximately 14 feet.

The width of the base line B of the isosceles triangle formed by lines X, Y and B is $$B = 12 + 2 \cdot E$$

where 12 feet is the standard width of each driving lane of the roadway, which is a constant. E is the average width of a vehicle which is approximately 5.5 feet, which means that B is approximately 23 feet.

Angle $\delta$ is the vertex viewing angle, which also relates to the radius of curvatures of the convex mirror. The radius of curvature of the present invention convex rearview mirror provides a vertex viewing angle of approximately 40 degrees. Therefore:

$$H = (23/2) \cdot c \tan(40/2)$$

which means that approximately $$H = 31 \text{ feet}$$

and approximately

D=22 feet

Since V is approximately 15 feet, $D = (22/15) \cdot V = 1.5 \cdot V$

The above results shows that the distance between vehicle 100 and vehicle 160 is approximately 1½ times of the average vehicle length, which is enough for vehicle 100 to make a lane change or turn.

Even in the worst case the safety locker is proved to be reliable. The worst case may be a motorcycle 180 traveling at the inner side of the right lane R. By similar calculations, it can be proved that when the entire motorcycle 180 is visible within the safety locker of the rearview mirror 10, the distance between the vehicle 100 and the motorcycle 180 is approximately 1·V, approximately one vehicle length.

It is noted that many numerical values used in above calculations may change, depending on different types of vehicles. However, many dimensional ratios used above do not vary significantly among different types of passenger cars. This means that the present invention rearview mirror and the principle of the safety reference and safety locker of the present invention can be generally applied to various types of vehicles.

It is further noted that the present invention convex rearview mirror can also be used in trucks. When used in trucks, the safety locker may be defined as the field directly above the tail end of the truck. In other words, the tail end of the truck can serve as a substitute for the rear window of a passenger car. The open sides on the right and left side of the truck may serve as a substitute for the side windows to constitute the safety reference.

It is additionally noted that (a) the approximate range of the radius of curvature of the present invention mirror may be from 36 inches to 145 inches, preferably from 75 inches to 100 inches; (b) the approximate range of the length of the mirror may be from 12 inches to 36 inches, preferably from 15 inches to 24 inches; and (c) the approximate range of width of the mirror may be from 1 inch to 12 inches, preferably from 2 inches to 8 inches.

The present invention of vehicle safety convex rearview mirror with distortion offset means and method of using the same has many advantageous features. The advantageous features of the present invention include: (a) the present invention elongated convex rearview mirror can provide a full rearward visual field to the driver of a vehicle without any problem blind spot; (b) the elongated convex rearview mirror can also provide a very clear image; (c) the mirror plate is releasably encased but not glued in the mirror housing, which avoids the aging problem of the glue and makes it possible and easier to replace the mirror plate alone; (d) the two ball-joints with offset U-shaped notches which maximizes the adjustability of the elongated convex rearview mirror; (e) the two offset U-shaped notches on the double-ball-joint support allows the mirror to be pushed all the way up against the roof, but still can be tilted to face the driver; (f) the two U-shaped notch on the mirror support shank shorten the length of the mirror support shank, which in turn reduces the weight and vibration of the mirror assembly and ensures the safety of the front windshield of the vehicle; (g) the two U-shaped notch on the mirror support shank extend the field of view in downward direction in the rear end of the vehicle; (h) the headlights of the following vehicles reflected by the convex mirror are reduced which provides an automatic anti-glare view; (i) the curvature of the convex backing of the mirror housing provides a shatter-proof feature which reduces possible harm from flying glass in case of accident; (j) the present invention safety reference feature permits the driver to judge when it is not safe to make a lane change or a turn by simply a quick glance at the rearview mirror; (k) the present invention safety locker feature permits the driver to judge when it is safe to make a lane change or a turn also by simply a quick glance at the rearview mirror; (l) the present invention nearest safety distance proves that the safety locker feature is reliable in practical applications. In addition, the fully detachable attachment of the present invention mirror assembly reduces the cost of packaging, assembling, freight and storage.

Defined in detail, the present invention is a vehicle safety convex rearview mirror assembly with distortion offset means for a vehicle having a passenger compartment interior surrounded by a front windshield, a rear window and side windows, the mirror assembly comprising: (a) an elongated thin convex mirror plate having two opposite ends, the mirror plate having a length of approximately 18 inches, a width of approximately 2 inches, and a radius of curvature of approximately 78 inches; (b) an elongated arcuate shaped mirror housing for releasibly framing said mirror plate, the mirror housing having an arcuate shaped guarded front side for backing said mirror plate, a flat back side with built-in screw nut, and two opposite ends for attachment of two end-covers, where said two opposite ends of said mirror plate are snugly held by the two end-covers; (c) a hollow extension shank having a proximal end and a distal end each having a ball-joint socket, each ball-joint socket having a U-shaped notch, the shank having a length of approximately 2¾ inches; (d) a pivot hub for pivotally interconnecting said mirror housing to said proximal end of said hollow extension shank, the hub having a proximal end and a distal end, the proximal end having screw threads for releasible engagement with said built-in screw nut of said mirror housing, and the distal end having a pivot ball engageable with said ball-joint socket at said proximal end of said extension shank, and a stem portion immediately adjacent to the pivot ball, which stem portion has a thickness matching said U-shaped notch at said proximal end of said shank; (e) a mirror mounting base having a proximal end and a distal end, the mirror mounting base further having a mounting plate at the distal end, which plate can be affixed on said windshield, a pivot ball at its proximal end, which pivot ball is engageable with said ball-joint socket at said distal end of said extension shank, and a stem portion immediately adjacent to the pivot ball, which stem portion has a thickness matching said U-shaped notch at said distal end of said shank; (f) two semi-spherical bowls and a coil spring contained inside said hollow extension shank, the two semi-spherical bowls being oppositely disposed for engaging respectively with said pivot ball at said distal end of said hub and said pivot ball at said proximal end of said mirror mounting base, the coil spring disposed between the two semi-spherical bowls for biasing the ball-joint engagements at said proximal end and said distal end of said extension shank to increase the friction at said ball-joint sockets; (g) said U-shaped notch of said ball-joint socket at said proximal end of said extension shank being offset to said U-shaped notch of said ball-joint socket at said distal end of said extension shank for allowing maximum adjustability of the position and the orientation of said mirror housing to have an extended rearward visual field reflected in said mirror plate; (h) a safety reference within said extended rearward visual field reflected in said mirror plate, the safety reference including two opposite end portions of said extended rearward visual field respectively prescribed by said side windows of said vehicle; and (i) a safety locker within said extended rearward visual field reflected in said mirror plate, the safety locker including a central portion of said extended rearward visual field respectively prescribed by said rear window of said vehicle; (j) whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to change lanes or make turns if the front end of other vehicle is only partially visible in said safety locker, but safe to do so if the other vehicle is entirely visible in said safety locker because by then the distance between the driver's vehicle and the other vehicle is not less than the nearest safety distance.

Defined broadly, the present invention is a vehicle safety rearview mirror assembly with distortion offset means for a vehicle having a passenger compartment interior surrounded by a front windshield, a rear window and side windows, the mirror assembly comprising: (a) an elongated thin convex mirror plate, the length of the mirror plate being within the range of approximately 15 inches to approximately 24 inches, the width of the mirror plate being within the range of approximately 2 inches to approximately 8 inches, and the radius of curvature of the mirror plate being within the range of approximately 75 inches to approximately 100 inches; (b) an elongated arcuate shaped mirror housing for releasibly framing said mirror plate; (c) an independent mirror mounting base affixed on said windshield of said vehicle; (d) an extension shank having a proximal end and a distal end, the proximal end being attached with said mirror housing through a first ball-joint, and the distal end being attached with said mirror mounting base through a second ball-joint, where the proximal and distal ends of the shank each has a ball-joint socket with U-shaped notch and the two U-shaped notches are offset, for allowing maximum adjustability of the position and the orientation of said mirror housing to have an extended rearward visual field reflected in said mirror plate; (e) a safety reference within said extended rearward visual field reflected in said mirror plate, the safety reference including two opposite end portions of said extended rearward visual field respectively prescribed by said side windows of said vehicle; and (f) a safety locker within said extended rearward visual field reflected in said mirror plate, the safety locker including a central portion of said extended rearward visual field respectively prescribed by said rear window of said vehicle; (g) whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to change lanes or make turns if the front end of other vehicle is only partially visible in said safety locker, but safe to do so if the other vehicle is entirely visible in said safety locker because by then the distance between the driver's vehicle and the other vehicle is not less than the nearest safety distance.

Defined more broadly, the present invention is a vehicle safety rearview mirror assembly with distortion offset means for a vehicle having a passenger compartment interior surrounded by a front windshield, a rear window and side windows, the mirror assembly comprising: (a) an elongated convex mirror plate, the length of the mirror plate being within the range of approximately 12 inches to approximately 36 inches, the width of the mirror plate being within the range of approximately 1 inches to approximately 12 inches, and the radius of curvature of the mirror plate being within the range of approximately 36 inches to approximately 145 inches; (b) an elongated arcuate shaped mirror housing for releasibly framing said mirror plate; (c) an independent mirror mounting base affixed on said windshield of said vehicle; (d) a shank having ball-joint socket with U-shaped notch at each of its opposite ends for interconnecting said mirror housing and said mirror mounting base for allowing maximum adjustability of the position and the orientation of said mirror housing to have an extended rearward visual field reflected in said mirror plate; (e) a safety reference within said extended rearward visual field reflected in said mirror plate, the safety reference including two opposite end portions of said extended rearward visual field respectively prescribed by said side windows of said vehicle; and (f) a safety locker within said extended rearward visual field reflected in said mirror plate, the safety locker including a central portion of said extended rearward visual field respectively prescribed by said rear window of said vehicle; (g) whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to change lanes or make turns if the front end of other vehicle is only partially visible in said safety locker, but safe to do so if the other vehicle is entirely visible in said safety locker because by then the distance between the driver's vehicle and the other vehicle is not less than the nearest safety distance.

Defined even more broadly, the present invention is a vehicle safety rearview mirror assembly with distortion offset means for a vehicle having a passenger compartment interior surrounded by a front windshield, a rear window and side windows, the mirror assembly comprising: (a) an elongated convex mirror plate; (b) an elongated arcuate shaped mirror housing for releasibly framing said mirror plate; (c) mounting means for independently supporting said mirror housing in said interior of said vehicle such that said mirror housing is located in a spaced apart relationship from said front windshield of said vehicle, the mounting means being able to allow maximum adjustability of the position and the orientation of said mirror housing to have an extended rearward visual field reflected in said mirror plate; (d) a safety reference within said extended rearward visual field reflected in said mirror plate, the safety reference including two opposite end portions of said extended rearward visual field respectively prescribed by said side windows of said vehicle; and (e) a safety locker within said extended rearward visual field reflected in said mirror plate, the safety locker including a central portion of said extended rearward visual field respectively prescribed by said rear window of said vehicle; (f) whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to change lanes or make turns if the front end of other vehicle is only partially visible in said safety locker, but safe to do so if the other vehicle is entirely visible in said safety locker because by then the distance between the driver's vehicle and the other vehicle is not less than the nearest safety distance.

Defined alternatively, the present invention is a distortion offset method for using a convex rearview mirror assembly installed in a vehicle having a passenger compartment interior surrounded by a front windshield, a rear window and side windows, the distortion offset method comprising the steps of: (a) utilizing a convex rearview mirror assembly which has an elongated convex mirror plate having a length of approximately 18 inches, a width of approximately 2 inches, and a radius of curvature of approximately 78 inches, the elongated mirror plate releasibly framed in a mirror housing; (b) mounting said mirror housing to said front windshield of said vehicle with an independent mounting means which includes a shank having ball-joint socket with U-shaped notch at each of its opposite ends, such that said mirror housing is located in a spaced apart relationship from said front windshield and has maximum adjustability of its position and its orientation to have an extended rearward visual field reflected in said mirror plate; (c) before changing lanes or making turns, checking a safety reference within said extended rearward visual field reflected in said mirror plate, which safety reference includes two opposite end portions of said extended rearward visual field respectively prescribed by said side windows of said vehicle; (d) if another vehicle appearing in said safety reference, then not changing lanes or making turns because it is unsafe to do so; (e) if no other vehicle appearing in said safety reference, then further checking a safety locker within said extended rearward visual field reflected in said mirror plate, which safety locker includes a central portion of said extended rearward visual field respectively prescribed by said rear window of said vehicle; (f) if the front end of another vehicle being only partially visible in said safety locker, then not changing lanes or making turns because it is unsafe to do so; and (g) if the front end of the other vehicle being entirely visible in said safety locker, then changing lanes of making turns accordingly because it is safe to do so since by then the distance between the driver's vehicle and the other vehicle is not less than the nearest safety distance; (h) whereby the distortion of said convex rearview mirror plate is offset by referring to said safety reference and said safety locker, and a driver can tell from a quick glance at said convex rearview mirror plate whether and when it is safe to change lanes or make turns.

Defined also alternatively, the present invention is a distortion offset method for using a convex rearview mirror assembly installed in a vehicle having a passenger compartment interior surrounded by a front windshield, a rear window and side windows, the distortion offset method comprising the steps of: (a) utilizing an elongated convex rearview mirror; (b) mounting independently and releasibly said mirror to said front windshield of said vehicle, such that said mirror is located in a spaced apart relationship from said front windshield of said vehicle, which allows maximum adjustability of the position and the orientation of said mirror to have an extended rearward visual field reflected in said mirror; (c) before changing lanes or making turns, checking a safety reference within said extended rearward visual field reflected in said mirror, which safety reference includes two opposite end portions of said extended rearward visual field respectively prescribed by said side windows of said vehicle; (d) if another vehicle appearing in said safety reference, then not changing lanes or making turns because it is unsafe to do so; (e) if no other vehicle appearing in said safety reference, then further checking a safety locker within said extended rearward visual field reflected in said mirror plate, which safety locker includes a central portion of said extended rearward visual field respectively prescribed by said rear window of said vehicle; (f) if the front end of another vehicle being only partially visible in said safety locker, then not changing lanes or making turns because it is unsafe to do so; and (g) if the front end of the other vehicle being entirely visible in said safety locker, then changing lanes or making turns accordingly because it is safe to do so since by then the distance between the driver's vehicle and the other vehicle is not less than the nearest safety distance; (h) whereby the distortion of said convex rearview mirror is offset by referring to said safety reference and said safety locker, and a driver can tell from a quick glance at said convex rearview mirror whether and when it is safe to change lanes or make turns.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A vehicle safety rearview mirror assembly with distortion offset means for a vehicle having a passenger compartment interior surrounded by a front windshield, a rear window and side windows, the mirror assembly comprising:

a. an elongated thin convex mirror plate having two opposite ends, the mirror plate having a length of approximately 18 inches, a width of approximately 2 inches, and a radius of curvature of approximately 78 inches;

b. an elongated arcuate shaped mirror housing for releasibly framing said mirror plate, the mirror housing having an arcuate shaped guarded front side for backing said mirror plate, a flat back side with built-in screw nut, and two opposite ends for attachment of two end-covers, where said two opposite ends of said mirror plate are snugly held by the two end-covers;

c. a hollow extension shank having a proximal end and a distal end each having a ball-joint socket, each ball-joint socket having a U-shaped notch, the shank having a length of approximately 2 ¾ inches;

d. a pivot hub for pivotally interconnecting said mirror housing to said proximal end of said hollow extension shank, the hub having a proximal end and a distal end, the proximal end having screw threads for releasible engagement with said built-in screw nut of said mirror housing, and the distal end having a pivot ball engageable with said ball-joint socket at said proximal end of said extension shank, and a stem portion immediately adjacent to the pivot ball, which stem portion has a thickness matching said U-shaped notch at said proximal end of said shank;

e. a mirror mounting base having a proximal end and a distal end, the mirror mounting base further having a mounting plate at the distal end, which plate can be affixed on said windshield, a pivot ball at its proximal end, which pivot ball is engageable with said ball-joint socket at said distal end of said extension shank, and a stem portion immediately adjacent to the pivot ball, which stem portion has a thickness matching said U-shaped notch at said distal end of said shank;

f. two semi-spherical bowls and a coil spring contained inside said hollow extension shank, the two semi-spherical bowls being oppositely disposed for engaging respectively with said pivot ball at said distal end of said hub and said pivot ball at said proximal end of said mirror mounting base, the coil spring disposed between the two semi-spherical bowls for biasing the ball-joint engagements at said proximal end and said distal end of said extension shank to increase the friction at said ball-joint sockets;

g. said U-shaped notch of said ball-joint socket at said proximal end of said extension shank being offset to said U-shaped notch of said ball-joint socket at said distal end of said extension shank for allowing maximum adjustability of the position and the orientation of said mirror housing to have an extended rearward visual field reflected in said mirror plate;

h. a safety reference within said extended rearward visual field reflected in said mirror plate, the safety reference including two opposite end portions of said extended rearward visual field respectively prescribed by said side windows of said vehicle; and i. a safety locker within said extended rearward visual field reflected in said mirror plate, the safety locker including a central portion of said extended rearward visual field respectively prescribed by said rear window of said vehicle;

j. whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to do so if the front end of the other vehicle is only partially visible in said safety locker, but safe to do so if the other vehicle is entirely visible in said safety locker because by then the distance between the driver's vehicle and the other vehicle is not less than the nearest safety distance.

2. The invention as defined in claim 1 wherein said two end-covers are respectively covered snugly on said opposite ends of said mirror plate and respectively fastened to said opposite ends of said mirror housing by small screws.

3. The invention as defined in claim 1 wherein said pivot hub further comprises a circular middle flange for engagement with said flat back side of said mirror housing.

4. The invention as defined in claim 1 wherein said mounting plate is adhered onto said windshield of said vehicle by adhesive material.

5. The invention as defined in claim 1 wherein said mounting plate is detachable from said mirror mounting base, said mirror mounting base has a flat slot for slidably adapting said mounting plate, and a screw for fastening said mounting plate once it slides in the flat slot.

6. The invention as defined in claim 1 wherein said extended rearward visual field reflected in said mirror plate covers a rearward visual range of approximately 89 degrees.

7. The invention as defined in claim 6 wherein said extended rearward visual field reflected in said mirror plate includes a right rearward visual field of approximately 37 degrees and a left rearward visual field of approximately 52 degrees.

8. The invention as defined in claim 1 wherein said safety reference includes a right safety reference which is the right end portion of said extended rearward visual field prescribed by said side windows on the right side of said vehicle.

9. The invention as defined in claim 1 wherein said safety reference includes a left safety reference which is the left end portion of said extended rearward visual field prescribed by said side windows on the left side of said vehicle.

10. The invention as defined in claim 1 wherein said safety locker covers a rearward visual range of approximately 40 degrees.

11. A vehicle safety rearview mirror assembly with distortion offset means for a vehicle having a passenger compartment interior surrounded by a front windshield, a rear window and side windows, the mirror assembly comprising:

a. an elongated thin convex mirror plate, the length of the mirror plate being within the range of approximately 15 inches to approximately 24 inches, the width of the mirror plate being within the range of approximately 2 inches to approximately 8 inches, and the radius of curvature of the mirror plate being within the range of approximately 75 inches to approximately 100 inches;

b. an elongated arcuate shaped mirror housing for releasibly framing said mirror plate;

c. an independent mirror mounting base affixed on said windshield of said vehicle;

d. an extension shank having a proximal end and a distal end, the proximal end being attached with said mirror housing through a first ball-joint, and the distal end being attached with said mirror mounting base through a second ball-joint, where the proximal and distal ends of the shank each has a ball-joint socket with a U-shaped notch and the U-shaped notch at the first ball-joint socket is offset to the U-shaped notch at the second ball-joint socket, such that the two U-shaped notches are respectively extending in two opposite lateral directions relative to a longitudinal lengthwise direction of the shank, for allowing maximum adjustability of the position and the orientation of said mirror housing to have an extended rearward visual field reflected in said mirror plate;

e. a safety reference within said extended rearward visual field reflected in said mirror plate, the safety reference including two opposite end portions of said extended rearward visual field respectively prescribed by said side windows of said vehicle; and f. a safety locker within said extended rearward visual field reflected in said mirror plate, the safety locker including a central portion of said extended rearward visual field respectively prescribed by said rear window of said vehicle;

g. whereby a driver can tell from a quick glance at said mirror plate whether it is safe to change lanes or make turns, when another vehicle appears in said safety reference, it is not safe to change lanes or make turns, when the other vehicle appears in said safety locker, it is not safe to do so if the front end of other vehicle is only partially visible in said safety locker, but safe to do so if the other vehicle is entirely visible in said safety locker because by then the distance between the driver's vehicle and the other vehicle is not less than the nearest safety distance.

12. The invention as defined in claim 11 wherein said mirror housing further comprises two end-covers for snugly fastening said mirror plate with said mirror housing.

13. The invention as defined in claim 11 wherein said mirror housing and said proximal end of said extension shank are interconnected by a separate pivot hub.

14. The invention as defined in claim 11 wherein said mirror mounting base includes a separable mounting plate which can be adhered to said windshield of said vehicle.

15. The invention as defined in claim 11 wherein said extension shank has a hollow chamber for retaining a coil spring to bias said two ball-joint, so that the friction at said two ball-joint are increased, which enables said extension shank and said mirror housing to stay put after their position and orientation being adjusted.

16. The invention as defined in claim 11 wherein the length of said mirror plate is approximately 18 inches.

17. The invention as defined in claim 11 wherein the width of said mirror plate is approximately 2 inches.

18. The invention as defined in claim 11 wherein the radius of curvature of said mirror plate is approximately 78 inches.

19. The invention as defined in claim 11 wherein said safety reference includes a right safety reference which is the right end portion of said extended rearward visual field prescribed by said side windows on the right side of said vehicle and a left safety reference which is the left end portion of said extended rearward visual field prescribed by said side windows on the left side of said vehicle.

20. The invention as defined in claim 1 wherein said safety locker covers a rearward visual range of approximately 40 degrees.

21. A vehicle safety rearview mirror assembly with distortion offset means for a vehicle having a passenger compartment interior surrounded by a front windshield, a rear window and side windows, the mirror assembly comprising:

a. an elongated convex mirror plate, the length of the mirror plate being within the range of approximately 12 inches to approximately 36 inches, the width of the mirror plate being within the range of approximately 1 inches to approximately 12 inches, and the radius of curvature of the mirror plate being within the range of approximately 36 inches to approximately 145 inches;

b. an elongated arcuate shaped mirror housing for releasibly framing said mirror plate;

c. an independent mirror mounting base affixed on said windshield of said vehicle;

d. a shank having a ball-joint socket with a U-shaped notch at each of its opposite ends for interconnecting said mirror housing and said mirror mounting base for allowing maximum adjustability of the position and the orientation of said mirror housing to have an extended rearward visual field reflected in said mirror plate, where the two U-shaped notches are offset to each other, such that the two U-shaped notches are respectively extending in two opposite lateral directions relative to a longitudinal lengthwise direction of the shank;

e. a safety reference within said extended rearward visual field reflected in said mirror plate, the safety reference including two opposite end portions of said extended rearward visual field respectively prescribed by said side windows of said vehicle; and f. a safety locker within said extended rearward visual field reflected in said mirror plate, the safety locker including a central portion of said extended rearward visual field respectively prescribed by said rear window of said vehicle;

g. whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to do so if the front end of other vehicle is only partially visible in said safety locker, but safe to do so if the other vehicle is entirely visible in said safety locker because by then the distance between the driver's vehicle and the other vehicle is not less than the nearest safety distance.

22. The invention as defined in claim 21 wherein the preferred length of said mirror plate is within the range of approximately 15 inches to approximately 24 inches.

23. The invention as defined in claim 21 wherein the preferred width of said mirror plate is within the range of approximately 2 inches to approximately 8 inches.

24. The invention as defined in claim 21 wherein the preferred radius of curvature of said mirror plate is within the range of approximately 75 inches to approximately 100 inches.

25. The invention as defined in claim 21 wherein the length of said mirror plate is approximately 18 inches.

26. The invention as defined in claim 21 wherein the width of said mirror plate is approximately 2 inches.

27. The invention as defined in claim 21 wherein the radius of curvature of said mirror plate is approximately 78 inches.

28. The invention as defined in claim 21 wherein said extended rearward visual field reflected in said mirror plate covers a rearward visual range of approximately 89 degrees.

29. The invention as defined in claim 21 wherein said safety reference includes a right safety reference within an right end portion of said extended rearward visual field prescribed by right side windows of said vehicle and a left safety reference within a left end portion of said extended rearward visual field prescribed by left side windows of said vehicle.

30. The invention as defined in claim 21 wherein said safety locker covers a rearward visual range of approximately 40 degrees.

31. A vehicle safety rearview mirror assembly with distortion offset means for a vehicle having a passenger compartment interior surrounded by a front windshield, a rear window and side windows, the mirror assembly comprising:
   a. an elongated convex mirror plate;
   b. an elongated arcuate shaped mirror housing for releasibly framing said mirror plate;
   c. mounting means for independently supporting said mirror housing in said interior of said vehicle such that said mirror housing is located in a spaced apart relationship from said front windshield of said vehicle, the mounting means including a shank having a ball-joint and a U-shaped notch extending in a lateral direction relative to a longitudinal lengthwise direction of the shank at each of its opposite ends for interconnecting said mirror housing and being able to allow maximum adjustability of the position and the orientation of said mirror housing to have an extended rearward visual field reflected in said mirror plate;
   d. a safety reference within said extended rearward visual field reflected in said mirror plate, the safety reference including two opposite end portions of said extended rearward visual field respectively prescribed by said side windows of said vehicle; and
   e. a safety locker within said extended rearward visual field reflected in said mirror plate, the safety locker including a central portion of said extended rearward visual field respectively prescribed by said rear window of said vehicle;
   f. whereby a driver can tell from a quick glance at said mirror plate whether and when it is safe to change lanes or make turns, when another vehicle appears in said safety reference, it is not safe to change lanes or make turns, when the other vehicle appears in said safety locker, it is not safe to do so if the front end of other vehicle is only partially visible in said safety locker, but safe to do so if the other vehicle is entirely visible in said safety locker because by then the distance between the driver's vehicle and the other vehicle is not less than the nearest safety distance.

32. The invention as defined in claim 31 wherein the length of said mirror plate is within the range of approximately 12 inches to approximately 36 inches.

33. The invention as defined in claim 31 wherein the width of said mirror plate is within the range of approximately 1 inches to approximately 12 inches.

34. The invention as defined in claim 31 wherein the radius of curvature of said mirror plate is within the range of approximately 36 inches to approximately 145 inches.

35. The invention as defined in claim 31 wherein the preferred length of said mirror plate is within the range of approximately 15 inches to approximately 24 inches.

36. The invention as defined in claim 31 wherein the width of said mirror plate is within the range of approximately 2 inches to approximately 8 inches.

37. The invention as defined in claim 31 wherein the radius of curvature of said mirror plate is within the range of approximately 75 inches to approximately 100 inches.

38. The invention as defined in claim 31 wherein the length of said mirror plate is approximately 18 inches.

39. The invention as defined in claim 31 wherein the width of said mirror plate is approximately 2 inches.

40. The invention as defined in claim 31 wherein the radius of curvature of said mirror plate is approximately 78 inches.

41. The invention as defined in claim 31 wherein said extended rearward visual field reflected in said mirror plate covers a rearward visual range of approximately 89 degrees.

42. The invention as defined in claim 31 wherein said safety reference includes a right safety reference within an right end portion of said extended rearward visual field prescribed by right side windows of said vehicle and a left safety reference within a left end portion of said extended rearward visual field prescribed by left side windows of said vehicle.

43. The invention as defined in claim 31 wherein said safety locker covers a rearward visual range of approximately 40 degrees.

44. A distortion offset method for using a convex rearview mirror assembly installed in a vehicle having a passenger compartment interior surrounded by a front windshield, a rear window and side windows, the distortion offset method comprising the steps of:
   a. utilizing a convex rearview mirror assembly which has an elongated convex mirror plate having a length of approximately 18 inches, a width of approximately 2 inches, and a radius of curvature of approximately 78 inches, the elongated mirror plate releasibly framed in a mirror housing;
   b. mounting said mirror housing to said front windshield of said vehicle with an independent mounting means which includes a shank having ball-joint socket with U-shaped notch at each of its opposite ends, where the two U-shaped notches are respectively extending in two opposite lateral directions relative to a longitudinal lengthwise direction of the shank, such that said mirror housing is located in a spaced apart relationship from said front windshield and has maximum adjustability of its position and its orientation to have an extended rearward visual field reflected in said mirror plate;
   c. before changing lanes or making turns, checking a safety reference within said extended rearward visual field reflected in said mirror plate, which safety reference includes two opposite end portions of said extended rearward visual field respectively prescribed by said side windows of said vehicle, as follows;
   d. in the case of another vehicle appearing in said safety reference, then not changing lanes or making turns because it is unsafe to do so;
   e. in the case of no other vehicle appearing in said safety reference, then further checking a safety locker within said extended rearward visual field reflected in said mirror plate, which safety locker includes a central portion of said extended rearward visual field respectively prescribed by said rear window of said vehicle;

f. in the case of the front end of another vehicle being only partially visible in said safety locker, then not changing lanes or making turns because it is unsafe to do so; and g. in the case of the front end of the other vehicle being entirely visible in said safety locker, then changing lanes or making turns accordingly because it is safe to do so since by then the distance between the driver's vehicle and the other vehicle is not less than the nearest safety distance;

h. whereby the distortion of said convex rearview mirror plate is offset by referring to said safety reference and said safety locker, and a driver can tell from a quick glance at said convex rearview mirror plate whether and when it is safe to change lanes or make turns.

45. The invention as defined in claim 44 wherein said extended rearward visual field reflected in said mirror plate covers a rearward visual range of approximately 89 degrees.

46. The invention as defined in claim 45 wherein said extended rearward visual field reflected in said mirror plate includes a right rearward visual field of approximately 37 degress and a left rearward visual field of approximately 52 degrees.

47. The invention as defined in claim 44 wherein said safety reference includes a right safety reference which is the right end portion of said extended rearward visual field prescribed by said side windows on the right side of said vehicle.

48. The invention as defined in claim 44 wherein said safety reference includes a left safety reference which is the left end portion of said extended rearward visual field prescribed by said side windows on the left side of said vehicle.

49. The invention as defined in claim 44 wherein said safety locker covers a rearward visual range of approximately 40 degrees.

50. A distortion offset method for using a convex rearview mirror assembly installed in a vehicle having a passenger compartment interior surrounded by a front windshield, a rear window and side windows, the distortion offset method comprising the steps of:

a. utilizing an elongated convex rearview mirror which includes an elongated convex mirror plate and an elongated arcuate shaped mirror housing for releasibly framing said mirror plate;

b. mounting said mirror near said front windshield of said vehicle by utilizing a mounting means which includes a shank having a ball-joint and a U-shaped notch extending in a lateral direction relative to a longitudinal lengthwise direction of the shank at each of its opposite ends for interconnecting said mirror housing, such that said mirror is located in a spaced apart relationship from said front windshield of said vehicle, which allows maximum adjustability of the position and the orientation of said mirror to have an extended rearward visual field reflected in said mirror;

c. before changing lanes or making turns, checking a safety reference within said extended rearward visual field reflected in said mirror, which safety reference includes two opposite end portions of said extended rearward visual field respectively prescribed by said side windows of said vehicle, as follows;

d. in the case of another vehicle appearing in said safety reference, then not changing lanes or making turns because it is unsafe to do so;

e. in the case of no other vehicle appearing in said safety reference, then further checking a safety locker within said extended rearward visual field reflected in said mirror plate, which safety locker includes a central portion of said extended rearward visual field respectively prescribed by said rear window of said vehicle;

f. in the case of the front end of another vehicle being only partially visible in said safety locker, then not changing lanes or making turns because it is unsafe to do so; and g. in the case of the front end of the other vehicle being entirely visible in said safety locker, then changing lanes or making turns accordingly because it is safe to do so since by then the distance between the driver's vehicle and the other vehicle is not less than the nearest safety distance;

h. whereby the distortion of said convex rearview mirror is offset by referring to said safety reference and said safety locker, and a driver can tell from a quick glance at said convex rearview mirror whether and when it is safe to change lanes or make turns.

51. The invention as defined in claim 50 wherein the length of said mirror plate is within the range of approximately 12 inches to approximately 36 inches.

52. The invention as defined in claim 50 wherein the width of said mirror plate is within the range of approximately 1 inches to approximately 12 inches.

53. The invention as defined in claim 50 wherein the radius of curvature of said mirror plate is within the range of approximately 36 inches to approximately 145 inches.

54. The invention as defined in claim 50 wherein said extended rearward visual field reflected in said mirror plate covers a rearward visual range of approximately 89 degrees.

55. The invention as defined in claim 50 wherein said safety locker covers a rearward visual range of approximately 40 degrees.

* * * * *